Figure 1:
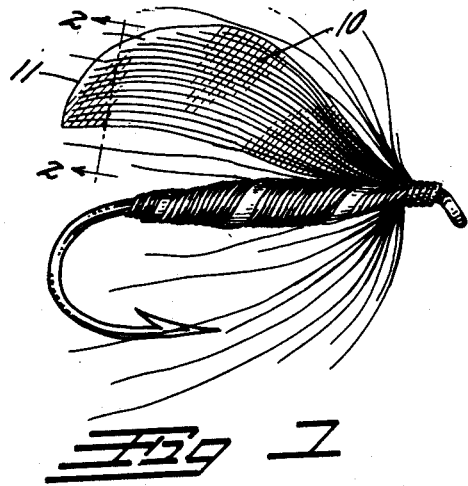

Jan. 31, 1928.  S. M. WRIGHT ET AL  1,657,734

FISHING FLY

Filed Jan. 29, 1925

INVENTORS
STANLEY M. WRIGHT
ANDREW D. McGILL
BY
R. H. Galbreath
ATTORNEY.

Patented Jan. 31, 1928.

1,657,734

UNITED STATES PATENT OFFICE.

STANLEY M. WRIGHT AND ANDREW D. McGILL, OF DENVER, COLORADO, ASSIGNORS TO WRIGHT AND McGILL COMPANY, OF DENVER, COLORADO, A CORPORATION OF COLORADO.

FISHING FLY.

Application filed January 29, 1925. Serial No. 5,622.

REISSUED

This invention relates to fishing flies. Flies of this character are usually built up of feathers colored and designed to simulate natural flies or other insects. In use, the flies are allowed to float upon the surface and with the current of a stream. When the limit of the fishing line is reached, they are withdrawn from the water and thrown with a sharp whipping action upon the upstream surface so that they may again float downward with the current. This whipping through the air soon results in destroying and fraying the feather structure of the wings of the flies.

When the flies are first formed, the feather is held in shape by the inter-locking of the vexilla and tendrils of the natural feather. Under normal conditions this inter-locking of the tendrils and vexilla is sufficient to maintain the web of the feather in its original form, but when subjected to the whipping action of the fish line, this natural inter-locking relation is insufficient to withstand the service. As a result, the feather is soon frayed out and each individual vane becomes independent from its neighbor. This fraying is especially rapid when the flies are used in swift mountain streams where they are subjected to the action of the current and to battering upon rocks.

Fishing flies have been treated with oils, paraffine, waxes, etc., in an endeavor to render them water-proof, and to prevent fraying. The oils, however, serve no purpose in holding the component parts of the feather together. The paraffines have insufficient tensile strength to tie the various parts so that they will withstand the strain. In fact, feathers treated with paraffine have been found to "whip out" almost as readily as the untreated feather. The usual trade varnishes have been used by the applicant in an endeavor to prevent fraying of the fly but they were found to discolor the feather and could not therefore be used on white wings. The usual trade varnish also appears to affect the attraction of the fly for the fish. Many successful fishermen will not use a fly with varnished wings for this reason.

The principal object of this invention is to provide a process and medium for treating the feathers of a fishing fly which will securely tie the component parts of the feather together; which will form a transparent waterproof casing over the entire feather structure and which will not in itself discolor and which will not affect the color of the feather.

Another object of the invention is to provide a substance for this purpose which will dry quickly so as to facilitate the manufacture of fishing flies.

Figure 2:
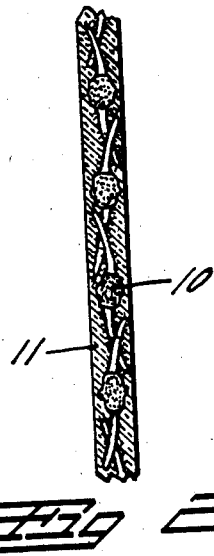

Other objects and advantages reside in our invention which will become more apparent from the following detailed description, reference being had to the accompanying drawing. In the drawing: Fig. 1 illustrates a fishing fly with the invention embodied; Fig. 2 is a cross section through the wing taken on the line 2—2, Fig. 1. The views are greatly magnified.

We attain the above objects by coating the feathers with nitro-cellulose dissolved in amyl acetate. The amyl acetate soon evaporates and leaves a uniform, impervious, transparent, flexible, waterproof, celluloid film over the entire structure through which the natural colors of the feather can be seen undiminished and unchanged. The coating is applied either by dipping the entire fly and hook therein, or by applying it only to the wings of the fly with a small brush.

In order to stiffen the feather in wings of those types of flies which have a comparatively large wing area, it is the present custom to employ a secondary stiffening wing or feather to serve as a support for the main wing. With the use of our process and medium, however, it is unnecessary to employ a stiffening wing, since the flexible celluloid film acts as a stiffener and the cost of manufacture of the large wing flies is thereby greatly lessened.

Unlike the film of the usual trade varnishes, the celluloid film will not dry out and become brittle but will maintain its flexibility indefinitely. A varnish coating upon the wings of a fly requires from two to three days to dry sufficiently for the flies to be packed. The amyl acetate, however, evaporates quickly and the flies are ready for packing in 15 to 20 minutes, thereby greatly increasing the ease of manufacture and reducing the cost thereof.

One of the applicants has an application pending, to wit Serial No. 536,452, filed February 14, 1922, in which the use of nitro-cellulose is mentioned. At this time, however, the most suitable product of nitro-cellulose was not known. The applicants have found that nitro-cellulose dissolved in amyl acetate is the most suitable product for this use. This product is substantially a liquid form of celluloid.

In the drawing the wing of a fly is shown at 10 completely surrounded by a film of celluloid 11.

While we have described in some detail methods of applying our improved medium, and of carrying out our process, it is understood that our invention is not limited to the precise procedure described nor is it dependent upon the accuracy of the theories which we have advanced. On the contrary, our invention is not to be regarded as limited except in so far as such limitations are included within the terms of the accompanying claims, in which it is our intention to claim all novelty inherent in our invention as broadly as is permissible in view of the prior art.

Having thus described our invention, what we claim and desire secured by Letters Patent is:—

1. A fishing fly comprising a body portion; wings attached to said body portion; and a celluloid coating surrounding said wings.

2. The combination with a fishing fly, having wings, of a transparent celluloid casing completely surrounding said wings.

In testimony whereof, we affix our signatures.

STANLEY M. WRIGHT.
ANDREW D. McGILL.